(12) United States Patent
Song et al.

(10) Patent No.: US 11,412,044 B1
(45) Date of Patent: Aug. 9, 2022

(54) DISCOVERY OF RESOURCES IN A VIRTUAL PRIVATE CLOUD

(71) Applicant: MICRO FOCUS LLC, Santa Clara, CA (US)

(72) Inventors: Qiuxia Song, Shanghai (CN); Zhongyi Yang, Shanghai (CN); Yiming Chen, Shanghai (CN); Yangyang Zhao, Shanghai (CN); Lei Xiao, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 17/550,944

(22) Filed: Dec. 14, 2021

(51) Int. Cl.
*H04L 67/1097* (2022.01)

(52) U.S. Cl.
CPC .................. *H04L 67/1097* (2013.01)

(58) Field of Classification Search
CPC .................................... H04L 67/1097
See application file for complete search history.

(56) References Cited

U.S. PATENT DOCUMENTS

| 9,246,765 | B2 | 1/2016 | Panuganty et al. |
| 9,313,281 | B1* | 4/2016 | Lietz ..................... H04L 67/51 |
| 9,860,225 | B1* | 1/2018 | Chamberlin ........ H04L 61/2514 |
| 10,673,716 | B1* | 6/2020 | Sethuramalingam ........................ G06F 9/4856 |
| 10,678,585 | B2 | 6/2020 | Zada et al. |
| 2014/0189680 | A1* | 7/2014 | Kripalani .................. G06F 8/61 717/176 |
| 2016/0048408 | A1* | 2/2016 | Madhu .................. H04L 47/783 718/1 |
| 2017/0093640 | A1* | 3/2017 | Subramanian ...... H04L 41/0806 |
| 2018/0123940 | A1* | 5/2018 | Rimar ..................... H04L 45/02 |
| 2018/0146049 | A1* | 5/2018 | Africa ................. H04L 41/0856 |
| 2018/0234459 | A1* | 8/2018 | Kung .................. H04L 63/0263 |
| 2019/0334757 | A1* | 10/2019 | Hill ......................... H04L 47/70 |
| 2021/0211356 | A1* | 7/2021 | Gati ....................... H04L 41/22 |

FOREIGN PATENT DOCUMENTS

| CN | 111597012 | | 8/2018 |
| CN | 111597012 A | * | 8/2020 |
| CN | 111857955 | | 10/2020 |

(Continued)

OTHER PUBLICATIONS

Amazon Web Services, Inc.; AWS Application Discovery Service-User Guide; Date Unknown; 105 pages.

(Continued)

*Primary Examiner* — Shean Tokuta (57) ABSTRACT

According to examples, an apparatus may include a processor and a memory on which are stored machine-readable instructions that when executed by the processor cause the processor to receive resource information correlated to a virtual private cloud (VPC). The resource information may be for discovery of resources in an instance in the VPC. The processor may upload the resource information to a cloud storage connected to the VPC. The resource information may be downloaded to an agent on the instance in the VPC to perform the discovery of resources in the instance to generate discovery information. The processor may receive the generated discovery information from the cloud storage. The generated discovery information may be uploaded to the cloud storage from the agent.

20 Claims, 4 Drawing Sheets

(56) References Cited

FOREIGN PATENT DOCUMENTS

EP       3276919 A1 *  1/2018  ........... H04L 41/046
KR       102136583      7/2020

OTHER PUBLICATIONS

Chandwadkar, et al; Agent Based Approach for Discovery of Cloud Services; Journal of Innovative Research in Computer Science & Technology; ISSN: 2347-5552, vol. 3, Issue-3; May 2015; 6 pages.
Micro Focus; Data Flow Management Guide; Universal CMDB; Software version, 10.33; Document Release Date, Sep. 2017; 784 pages.

* cited by examiner

DISCOVERY OF RESOURCES IN A VIRTUAL PRIVATE CLOUD

BACKGROUND

Devices may be implemented in network environments, such as on-premises networks and cloud-based networks. Discovery may be performed on the networks to identify resources available in the networks.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as to not unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Generally, discovery in a network environment may be important for network management in both on-premises and cloud-based networks, particularly as more and more on-premises networks may be migrated to cloud-based networks. In some examples, a probe may be installed in a network to perform discovery of resources on the network. The probe may be a component, such as a software component, responsible for scheduling and executing discovery and other tasks, and sending results back to a server, such as a configuration management database (CMDB) server.

For implementations in on-premises networks, the probe may be installed in the on-premises network for discovery of resources. For implementations in cloud-based networks, the probe may be installed on a particular a virtual private cloud (VPC) among a plurality of VPCs in the cloud-based network for discovery of resources. However, there may be concerns associated with implementation of the probe in a VPC in a cloud-based network.

A cloud-based network may include a plurality of VPCs. The VPCs may be virtual networks that may support one or more than one instance. An instance as described herein may be a virtual machine (VM) created in the cloud, for instance, on a VPC. An instance may operate as a virtual server in the cloud, and may be launched to have certain capabilities and characteristics, such as a particular operating system (OS), hardware configuration, applications, and/or the like. Instances may be started and stopped similar to an on-premises computer, and may be terminated when the instances are no longer needed. In the present application, an instance may be referred to as a VM instance, a cloud instance, or a cloud virtual machine instance.

Due to the characteristics of instances in VPCs in a cloud-based network, instances in different VPCs may not be connected to each other, and may be isolated from each other in the cloud-based network. In some examples where the probe may be installed on a particular VPC, the probe may be able to access only those instances that belong to the VPC to which it is installed, The probe may be unable to perform discovery for instances on the other VPCs in the cloud-based network.

In some instances, it may be difficult to implement the probe over a cloud-based network to access instances in different VPCs due to instabilities in the IP addresses allocated to the instances. For instance, due to cost issues, instances may be powered on when they are to be used, and in some instances, the IP addresses may be reassigned each time these instances are powered on. In these instances, frequent assignment/reassignment of IP addresses may introduce instabilities in the IP addresses for instances.

In other instances, duplicate IP addresses may introduce instability to the IP addresses allocated to the instances. Multiple VPCs in a cloud-based network may use the same range of IP addresses for instances allocated in respective VPCs. By way of particular example, a format of IP addresses may be based on a predetermined protocol, such as the Internet Protocol version 4 (IPv4), IPv6, and/or the like. A range of the IP addresses available to a first VPC may be set as "10.10.0.0/24", where "/24" may represent the subnet mask. In this example, a second VPC in the cloud-based network may be implemented to use the same range of IP addresses as the first VPC, specifically "10.10.0.0/24". In such instances, it may be possible that an instance in the first VPC may have the same IP address as an instance in the second VPC. Potential for such duplication in IP addresses may cause instability, for instance, when using the IP addresses for instances across different VPCs. As a result, some connections between the probe and instances may not be valid and/or cannot be guaranteed for relatively long periods of time, In other instances, it may be difficult to connect the probe to a plurality of instances on different VPCs when the instances have unique credentials for connection. In many instances, the credentials for the instances may not be unified, for instance because each of the instances has their own unique credentials. As a result, it may be difficult in these instances to use a probe for discovery in multiple instances because of the unique credentials needed to establish connection.

Disclosed herein are apparatuses, methods, and computer-readable mediums to perform discovery of resources for instances on multiple VPCs based on a probe installed on one of the multiple VPCs. In some examples, a probe and a plurality of VPCs in a cloud-based network may be connected to a cloud storage, By using the cloud storage to transfer resource information, such as a scanner to scan the instances, the probe may indirectly cause discovery to be performed at the instances, without directly connecting to the instances. In some examples, a processor may receive resource information correlated to a certain VPC for discovery of resources in an instance in that VPC. The processor may upload the resource information to the cloud storage connected to the VPC. The resource information may be downloaded to an agent on the instance in the VPC to perform the discovery of resources in the instance and upload discovery information to the cloud storage. The processor may receive the generated discovery information from the cloud storage.

Through implementation of the features of the present disclosure, a probe may enable discovery in instances at different VPCs, without being directly connected to the instances. In some examples, a cloud storage may be connected between the probe and the instances to enable connection, and thus, for instance, a reliable connection to the cloud storage may be established without concerns related to credentials, duplicate/unstable IP addresses, and/or the like, which may be needed to establish direct connections from a probe to the instances. Accordingly, consumption of computing resources associated with maintaining credentials and/or managing duplicate/unstable IP addresses may be reduced.

Additionally, by enabling discovery using customized resource information, which may include a scanner, a configuration file, and scheduling information to customize the scanner, the processor may improve flexibility in performing discovery as well as improve a quality of the obtained discovery information. Thus, for instance, the discovery information may include information on hardware resources and/or software resources on the instances as well as, for instance, information regarding relationships between processes and/or services running at the instances. As such, the improved discovery information may in turn improve an efficiency and a speed of a migration from an on-premises to a cloud-based network, in asset management, and/or the like, which in turn may reduce consumption of computing resources.

Figure 1:
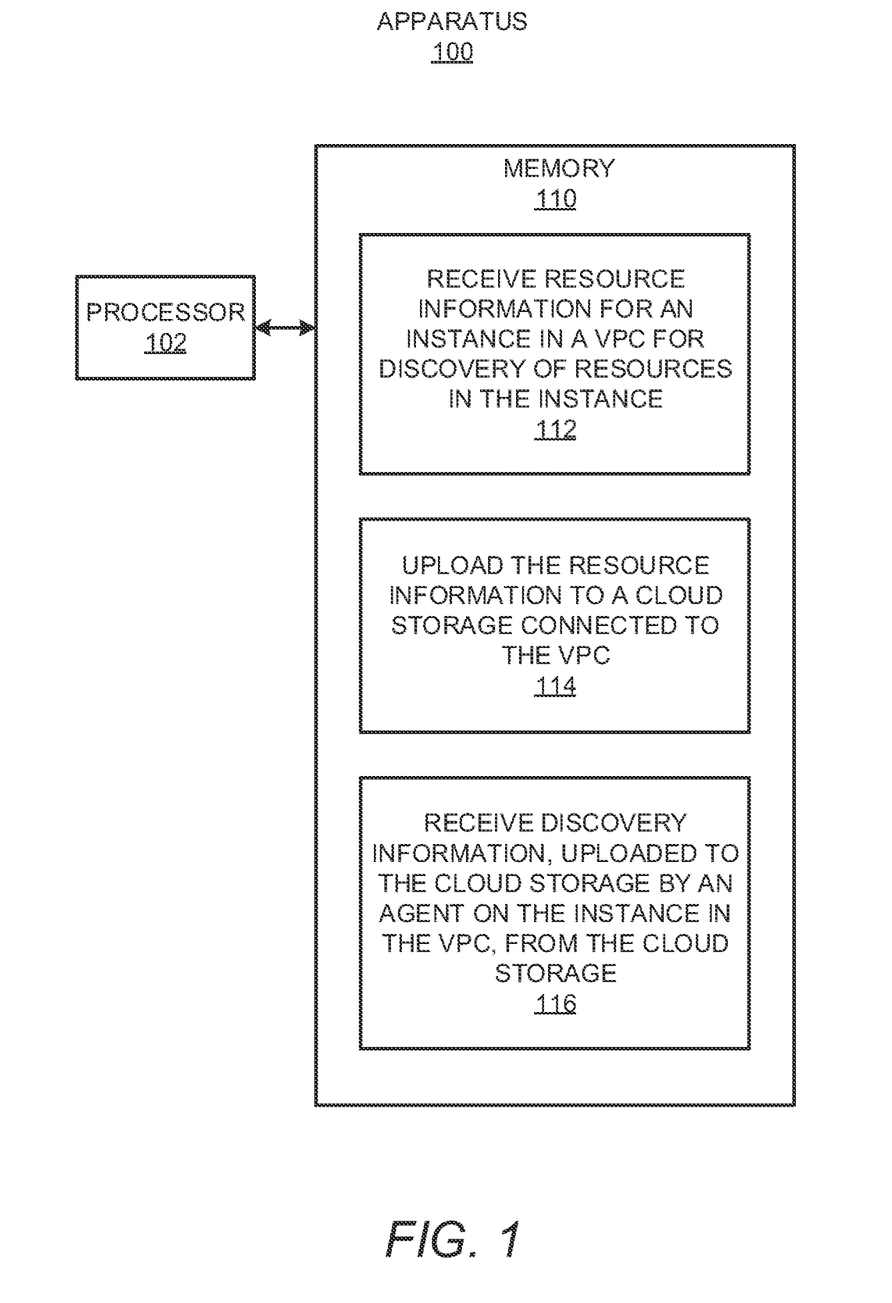
FIG. 1 shows a block diagram of an example apparatus that may upload resource information to a cloud storage for discovery of resources in an instance on a virtual private cloud (VPC) and receive discovery information, which may be uploaded to the cloud storage by an agent on the instance in the VPC, from the cloud storage.
Figure 2:
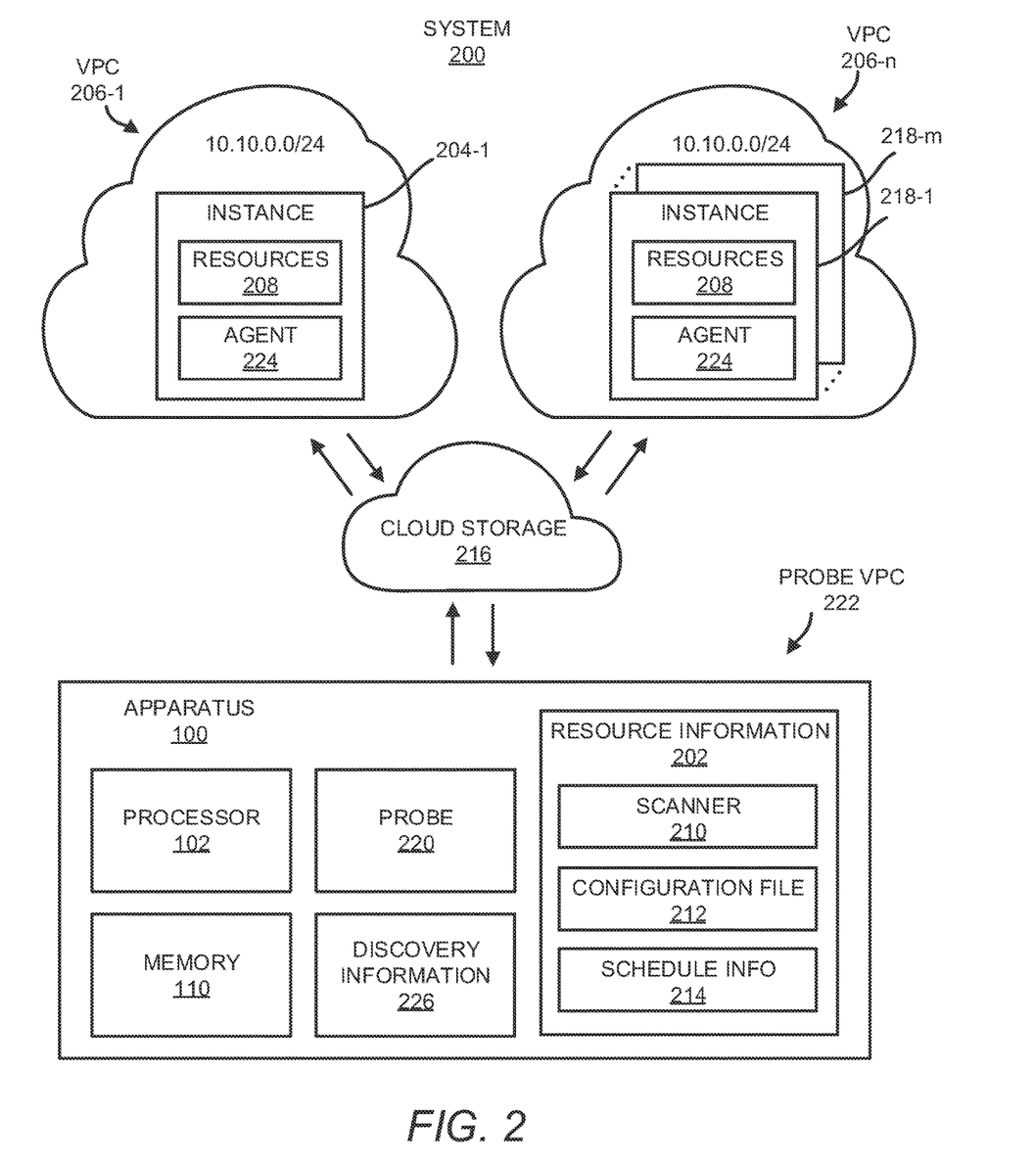
FIG. 2 shows a block diagram of an example system in which the example apparatus depicted in FIG. 1 may be implemented.

Reference is made to FIGS. 1 and 2. FIG. 1 shows a block diagram of an example apparatus 100 that may upload resource information to a cloud storage for discovery of resources in an instance on a VPC and receive discovery information, which may be uploaded to the cloud storage by an agent on the instance in the VPC, from the cloud storage. FIG. 2 shows a block diagram of an example system 200 in which the example apparatus 100 depicted in FIG. 1 may be implemented. It should be understood that the example apparatus 100 depicted in FIG. 1 and the example system 200 depicted in FIG. 2 may include additional features and that some of the features described herein may be removed and/or modified without departing from the scopes of the apparatus 100 and/or the system 200.

The apparatus 100 may be a server (such as a management server), a node in a network (such as a data center), a personal computer, a laptop computer, a tablet computer, a smartphone, and/or the like. As shown, the apparatus 100 may include a processor 102 and a memory 110, e.g., a non-transitory computer-readable medium. In some examples, the apparatus 100 may be a management server in a cloud-based management platform that has stored thereon instructions that may cause the processor 102 to execute discovery processes to discover network configuration information on multiple cloud platforms.

The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and/or multiple memories 110.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Erasable Programmable Read-Only Memory (EPROM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown, the memory 110 may have stored thereon instructions 112-116 that the processor 102 may fetch, decode, and execute. Particularly, the processor 102 may execute the instructions 112-116 to obtain discovery information for discovery of resources in an instance in a VPC. The instructions 112-116 may be non-transitory machine-readable instructions (or equivalently, non-transitory computer-readable instructions).

The processor 102 may fetch, decode, and execute the instructions 112 to receive resource information 202 for an instance 204-1 in a VPC 206-1. In some examples, the instance 204-1 may be a VM instance in a cloud-based network, such as the VPC 206-1.

The resource information 202 may be for discovery of resources 208 in the instance 204-1 in the VPC 206-1. In some examples, the resource information 202 may include information, such as application programs, scripts, configuration settings, and/or the like, which may be used to perform discovery at the instance 204-1.

In some examples, the resource information 202 may include a scanner 210, a configuration file 212, and schedule information 214. The scanner 210 may be a tool to collect information about resources 208 in the instance 204-1. In some examples, the scanner 210 may scan the instance 204-1 at a file system level. In this regard, the scanner 210 may be a type that is compatible with characteristics of the instance 204-1, such as an operating system (OS) type, an OS architecture, a file system, hardware, data store types and locations, and/or the like of the instance 204-1 to be scanned. In some examples, the scanner 210 may scan the resources 208, including hardware resources and software resources on the instance 204-1. In some examples, the scanner 210 may scan processes and/or services running on the instance 204-1, relationships between the processes and/or services, and/or the like. The processor 102 may customize the scanner 210, for instance, by use of a configuration file 212, to scan different types and/or amounts of information.

The configuration file 212 may include information, such as configuration settings, which may be used to configure the scanner 210. The configuration file 212 may include configuration settings that may be specific to the VPC 206-1 on which the instance 204-1 is implemented. For instance, the processor 102 may identify the configuration file 212 among a plurality of configuration files stored in a data store, based on characteristics of the instance 204-1 to be scanned. hi some examples, the processor 102 may identify the configuration file 212 based on characteristics including a type of the scanner 210, the OS type, the OS architecture, the file system, hardware, data store types and locations, and/or the like of the instance 204-1. The configuration file 212 may include user-defined settings and may be stored in a data store, such as a CMDB.

As such, the processor 102 may cause the scanner 210 to be customized using the configuration file 212, to generate certain types and/or amounts of information. For instance, the configuration file 212 may configure the scanner 210 to generate information related to certain hardware resources and/or software resources in the instance 204-1, such as information for a processing resource, a memory resource, a circuit board, an installed software, a running software, ports correlated to processes running on the instance, and/or a combination thereof.

The schedule information 214 may include information to set a schedule for operating the scanner 210. In some examples, the schedule information 214 may include schedule scripts, which may be executed to cause the scanner 210 to perform discovery at the instance 204-1. By way of particular example, the scanner 210 may perform discovery based on a predetermined schedule defined in the schedule information 214, for instance, at predetermined times and/or dates, at predetermined time intervals, correlated with predetermined events, and/or the like. In some examples, the schedule information 214 may be user-defined and may be stored in a data store, such as a CMDB. The processor 102 may identify the schedule information 214, among a plurality of schedule information for different VPCs, to be received from the data store based on the characteristics of the instance 204-1 to be scanned. In some examples, the processor 102 may identify the schedule information 214 based on a type of the scanner 210, the OS type, the OS architecture, the file system, hardware, data store types and locations, and/or the like of the instance 204-1.

The processor 102 may fetch, decode, and execute the instructions 114 to upload the resource information 202 to a cloud storage 216 on the cloud-based network. The cloud storage 216 may be connected to the VPC 206-1 and the instance 204-1 in the VPC 206-1. In some examples, the cloud storage 216 may be accessible to any device on the cloud-based network configured to have access to the cloud storage 216. For instance, the cloud storage 216 may be accessible to any number of VPCs 206-1 to 206-$n$ and instances 204-1 and 218-1 to 218-$m$ in those VPCs.

By way of particular example and for purposes of illustration, the apparatus 100 may include a probe 220 to perform discovery of resources. In order to implement the probe 220 in a cloud-based network for discovery on instances at different VPCs, the probe 220 may be installed at one VPC, such as the probe VPC 222, and connected to each instance for discovery. For instance, a direct connection between the probe 220 and each of the instances for which the probe 220 is to perform discovery may be needed for the probe 220 to perform the discovery, However, in some instances, the probe 220 may be unable to establish a direct connection to the remote instances, such as instance 204-1, for instance, due to unknown credentials, duplicate or unreliable IP addresses, and/or the like. In some examples, the probe 220 may indirectly cause the discovery at the instance 204-1, without a direct connection to the instance 204-1. For instance, the processor 102 may enable the probe 220 to control discovery via the resource information 202 and a connection through the cloud storage 216 to send the resource information 202 to the instance 204-1, rather than establishing a direct connection to the instance 204-1.

According to examples, the probe 220 may indirectly cause the discovery to be performed at the instance 204-1 through use of the resource information 202. For instance, the probe 220 may prepare the resource information 202 to be uploaded to the cloud storage 216. In this regard, the probe 220 may identify the resource information 202 based on characteristics of the instance 204-1 in the VPC 206-1.

In some examples, the instance 204-1 may include an agent 224 to perform discovery in the instance 204-1. The agent 224 may download the resource information 202 from the cloud storage 216, and may use the resource information 202 to perform the discovery at the instance 204-1. In some examples, the agent 224 may access the cloud storage 216 for downloading the resource information 202 at predetermined events, at predetermined times, and/or the like. For instance, the agent 224 may attempt to download the resource information 202 at a certain event, such as each time the instance 204-1 is started. Alternatively or additionally, the agent 224 may download the resource information 202 at a scheduled date and/or time, at predetermined intervals, and/or the like. In some examples, the agent 224 may access the cloud storage 216 to download an updated version of the resource information 202 based on a schedule for download as defined in a previous version of the schedule information 214.

The agent 224 may execute code to launch the scanner 210 to perform the discovery. The agent 224 may control the scanner 210 based on the configuration file 212 and the schedule information 214. In some examples, the agent 224 may operate the scanner 210 based on the configuration file 212 and the schedule information 214 to perform a file system level scan of resources 208 on the instance 204-1. The file system level scan may include a scan of hardware resources, software resources, processes and/or services running on the instance 204-1, and/or the like.

Based on the resource information 202, the agent 224 may cause the scanner 210 to perform the scan of the resources 208 and may generate the discovery information 226 based on the scan. The discovery information 226 may also be referred to in the present disclosure as a scan file. The agent 224 may upload the discovery information 226 to the cloud storage 216, which may then be accessed by the probe 220 for processing.

The discovery information 226 may include information generated from the scan of the hardware resources and/or the software resources. The discovery information 226 may include information for a processing resource, a memory resource, a circuit board, an installed software, a running software, ports correlated to processes running on the instance, and/or combinations thereof. In some examples, the discovery information 226 may include information from the scanner 210 for a CPU, a motherboard, adapters, file systems, and/or the like. The scanner 210 may also discover information related to installed software, idle software, running software, and/or like. The discovery information 226 may include connections between different instances, such as a connection between instance 204-1 and instance 218-1 at VPC 206-$n$. In some examples, the discovery information 226 may include details for OS services, drivers, processes and/or services running on the instance 204-1, information regarding a relationship between the processes and/or services, and/or the like.

In some examples, the agent 224 may be an application program installed in the instance 204-1, which in some instances, may be preinstalled at the instance 204-1. In some examples, the agent 224 may be installed using a deployment tool for batch installation of the agent 224 in multiple instances 204-1 and 218-1 to 218-*m*. The agent 224 may be configured for connection to the cloud storage 216.

The processor 102 may fetch, decode, and execute the instructions 116 to receive the discovery information 226, which may be uploaded from the agent 224, from the cloud storage 216. In some examples, the processor 102 may parse, or may cause the probe 220 to parse, the discovery information 226 to generate configuration information (CI) correlated to the resources 208 in the instance 204-1. The CI may be stored in the CMDB.

In some examples, the processor 102 may parse the discovery information 226 to identify a process that may be running on the instance 204-1. Based on the identified process that may be running on the instance 204-1, the processor 102 may determine an installed software and/or a running software in the instance 204-1. In some examples, the processor 102 may apply predetermined rules to the parsed discovery information 226, which may allow the processor 102 to recognize software, processes, services, connections between different instances, and/or the like.

In some examples, the processor 102 may identify a port (not shown) correlated to a process that may be running on the instance 204-1 based on information for hardware resources and/or software resources in the instance 204-1. The processor 102 may analyze a connection between the instance 204-1 in the VPC 206-1 and another instance in another VPC among a plurality of VPCs connected to the cloud storage 216, such as the instance 218-1 in VPC 206-*n*. In some examples, the processor 102 may identify a relationship between processes and/or services that may be running on a single instance, such as instance 204-1, or running on multiple instances, such as among instances 204-1 and 218-1 to 218-*m*.

Figure 3:
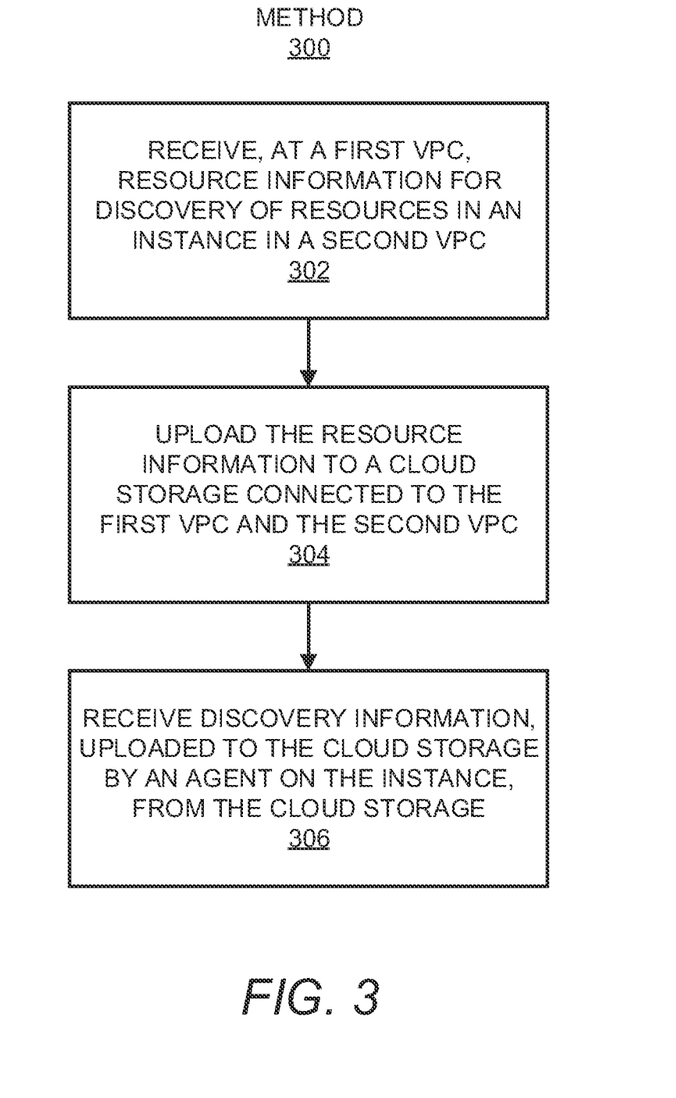
FIG. 3 shows a flow diagram of an example method for uploading resource information to a cloud storage connected to a VPC and receiving discovery information for resources on the instance in the VPC based on the uploaded resource information.

Various manners in which the processor 102 may operate are discussed in greater detail with respect to the method 300 depicted in FIG. 3. FIG. 3 depicts a flow diagram of an example method 300 for uploading resource information to a cloud storage connected to a VPC and receiving discovery information for resources on the instance in the VPC based on the uploaded resource information. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 102 may receive at a first VPC, such as a probe VPC 222, resource information 202 for discovery of resources 208 in an instance in a second VPC, such as the instance 204-1 in VPC 206-1, as depicted in FIG. 2. The probe VPC 222 may include a probe 220 to discover the resources 208 in the instance 204-1 in the VPC 206-1. The probe VPC 222 may be separate from the VPC 206-1.

At block 304, the processor 102 may upload the resource information 202 to a cloud storage 216. The cloud storage 216 may be connected to the devices on the cloud-based network, including the probe VPC 222 and the VPC 206-1. The resource information 202 may be downloaded by an agent 224 at the instance 204-1. The agent 224 may be installed on the instance 204-1 in the VPC 206-1 to perform the discovery of resources 208 in the instance 204-1. In some examples, the agent 224 may execute code to initiate a scanner 210 to generate discovery information 226.

At block 306, the processor 102 may receive the discovery information 226 from the cloud storage 216. The discovery information 226 may be uploaded to the cloud storage 216 from the agent 224, In some examples, the processor 102 may identify resource information 202 correlated to the instance 204-1 based on characteristics of the instance 204-1 in the VPC 206-1. For instance, the processor 102 may identify resource information 202 based on an OS of the instance 204-1 at which the resource information 202 may be executed. The processor 102 may upload the resource information 202 from the probe VPC 222 to the cloud storage 216 through the probe 220. In some examples, the resource information 202 may include a scanner 210 to scan the instance 204-1, a configuration file 212 to configure the scanner 210, schedule information 214 to scan the instance 204-1 and to upload the generated discovery information 226 to the cloud storage 216, and/or the like.

In some examples, the processor 102 may parse the discovery information 226 to generate CI correlated to the resources 208 in the instance 204-1. The CI may be stored in a CMDB. In some examples, the CI may be used to update data in the CMDB related to resources 208 available at the instance 204-1, In some examples, the generated discovery information 226 may include information for hardware resources, software resources, and/or the like in the instance 204-1. The information for the hardware resources and the software resources may include information for a processing resource, a memory resource, a circuit board, an installed software, a running software, ports correlated to processes running on the instance, and a combination thereof.

In some examples, the processor 102 may identify a process running on the instance 204-1 based on information for hardware resources, software resources, and/or the like in the instance 204-1. The processor 102 may determine installed software, running software, and/or the like in the instance 204-1 based on the identified process running on the instance 204-1.

In some examples, the processor 102 may identify a port, which may be correlated to a process running on the instance 204-1, based on information for hardware resources, software resources, and/or the like in the instance 204-1. The processor 102 may analyze a connection between the instance 204-1 in the VPC 206-1 and another instance in another VPC among a plurality of VPCs connected to the cloud storage 216, such as the instance 218-1 in VPC 206-*n* as depicted in FIG. 2, based on the discovery information 226.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic apparatus capable of executing the above-described functions may perform those functions enumerated above.

Figure 4:
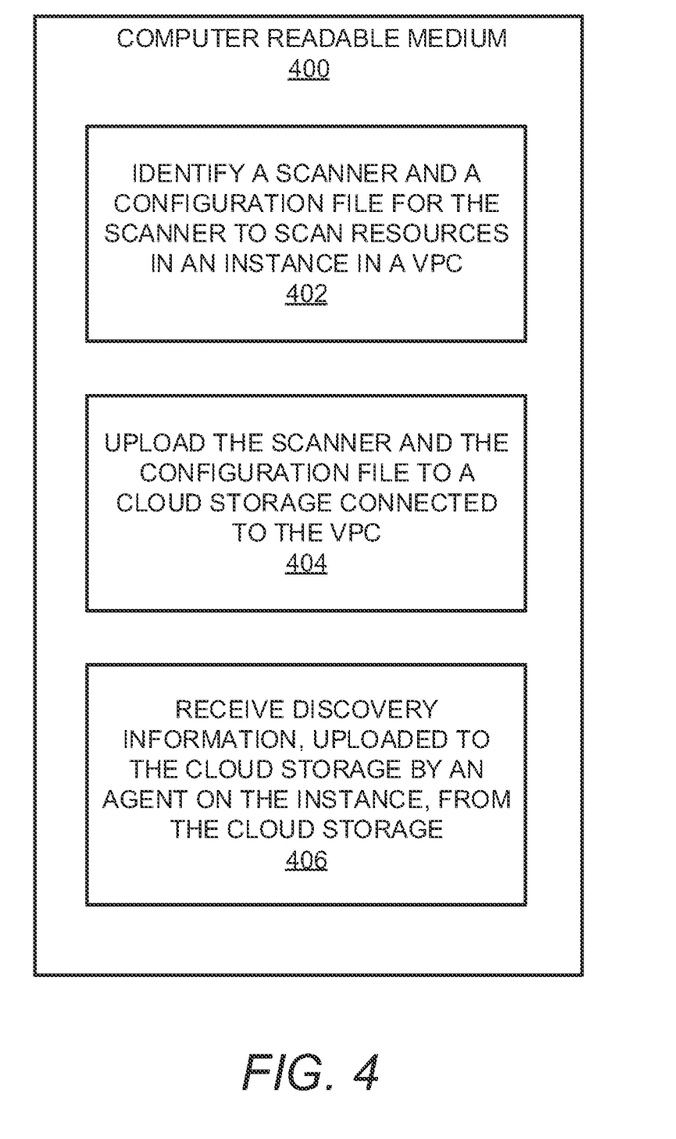
FIG. 4 shows a block diagram of an example non-transitory computer-readable medium that may have stored thereon machine readable instructions to identify a scanner and a configuration file for the scanner to scan resources in an instance in a VPC, upload the scanner and the configuration file to a cloud storage connected to the VPC, and receive discovery information from the cloud storage.

Turning now to FIG. 4, there is shown a block diagram of an example non-transitory computer-readable medium 400 that may have stored thereon machine readable instructions to identify a scanner and a configuration file for the scanner to scan resources in an instance in a VPC, upload the scanner and the configuration file to a cloud storage connected to the VPC, and receive discovery information from the cloud storage. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium. The term "non-transitory" does not encompass transitory propagating signals. The description of the non-transitory computer-readable medium 400 is also made with reference to the features depicted in FIGS. 1 and 2 for purposes of illustration. Particularly, the processor 102 of the apparatus 100 may execute some or all of the instructions 402-406 included in the non-transitory computer-readable medium 400.

The computer-readable medium 400 may have stored thereon machine-readable instructions 402-406 that a processor, such as the processor 102 depicted in FIGS. 1 and 2, may execute. The computer-readable medium 400 may be an electronic, magnetic, optical, or other physical storage device that contains or stores executable instructions. The computer-readable medium 400 may be, for example, RAM, EEPROM, a storage device, an optical disc, or the like.

The processor may fetch, decode, and execute the instructions 402 to identify a scanner 210 and a configuration file 212 for the scanner 210 to scan resources 208 in an instance 204-1 in a VPC 206-1. The scanner 210 and the configuration file 212 may be identified based on an OS of the instance 204-1. In some examples, the configuration file 212 may include scheduling information for the scanner 210. In some examples, the schedule information 214 may be incorporated into the configuration file 212.

The processor may fetch, decode, and execute the instructions 404 to upload the scanner 210 and the configuration file 212 to a cloud storage 216 connected to the VPC 206-1. The scanner 210 and the configuration file 212 may be downloaded by an agent 224 on the instance 204-1 in the VPC 206-1 to scan the instance 204-1 to generate discovery information 226.

The processor may fetch, decode, and execute the instructions 406 to receive the discovery information 226 from the cloud storage 216, The discovery information 226 may be uploaded to the cloud storage 216 from the agent 224.

In some examples, a probe VPC 222 may be connected to the cloud storage 216, The probe VPC 222 may be separate from the VPC 206-1 and may include a probe 220 to receive and parse the discovery information 226 from the cloud storage 216.

In some examples, the processor may parse the discovery information 226 to generate CI correlated to the resources 208 in the instance 204-1 to be stored in a CMDB. The discovery information 226 may include information for hardware resources, software resources, and/or the like in the instance 204-1. The information for the hardware resources and the software resources may include information for a processing resource, a memory resource, a circuit board, an installed software, a running software, ports correlated to processes running on the instance, and a combination thereof.

In some examples, the processor may identify a process running on the instance 204-1 based on information for hardware resources, software resources, and/or the like in the instance 204-1. In some examples, based on the identified process running on the instance 204-1 the processor may determine installed software, running software, and/or the like in the instance. Alternatively or additionally, the processor may analyze a connection between the instance 204-1 in the VPC 206-1 and another instance in another VPC among a plurality of VPCs connected to the cloud storage 216, such as instance 218-1 in the VPC 206-n as depicted in FIG. 2.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which are stored machine-readable instructions that when executed by the processor, cause the processor to:
      receive resource information for an instance in a virtual private cloud (VPC), the resource information being for discovery of resources in the instance in the VPC;
      upload the resource information to a cloud storage connected to the VPC, the resource information to be downloaded to an agent on the instance in the VPC to perform the discovery of resources in the instance to generate discovery information; and
      receive the generated discovery information from the cloud storage, the generated discovery information being uploaded to the cloud storage from the agent.

2. The apparatus of claim 1, wherein a probe VPC is connected to the cloud storage, the probe VPC being separate from the VPC and including a probe to receive and parse the generated discovery information from the cloud storage.

3. The apparatus of claim 1, wherein the instructions cause the processor to:
   identify the resource information to be uploaded to the cloud storage based on characteristics of the instance in the VPC.

4. The apparatus of claim 1, wherein the instructions cause the processor to:
   identify the resource information for the discovery of resources based on an operating system (OS) of the instance, the identified resource information including a scanner to scan the instance, a configuration file to configure the scanner, and/or a schedule information to scan the instance and to upload the generated discovery information to the cloud storage.

5. The apparatus of claim 1, wherein the instructions cause the processor to:
   parse the generated discovery information to generate configuration information (CI) correlated to the resources in the instance to be stored in a configuration management database (CMDB).

6. The apparatus of claim 1, wherein the generated discovery information includes information for hardware resources and/or software resources in the instance, the information for the hardware resources and/or the software resources including information for a processing resource, a memory resource, a circuit board, an installed software, a running software, ports correlated to processes running on the instance, and/or combinations thereof.

7. The apparatus of claim 1, wherein the instructions cause the processor to:
identify a process running on the instance based on information for hardware resources and/or software resources in the instance; and
determine installed software and/or running software in the instance based on the identified process running on the instance.

8. The apparatus of claim 1, wherein the instructions cause the processor to:
identify a port correlated to a process running on the instance based on information for hardware resources and/or software resources in the instance; and
analyze a connection between the instance in the VPC and another instance in another VPC among a plurality of VPCs connected to the cloud storage.

9. A method comprising:
receiving, by a processor at a first virtual private cloud (VPC), resource information for discovery of resources in an instance in a second VPC, the first VPC including a probe to discover the resources in the instance in the second VPC and being separate from the second VPC;
uploading, by the processor, the resource information to a cloud storage connected to the first VPC and the second VPC, the resource information to be downloaded by an agent on the instance in the second VPC to perform the discovery of resources in the instance to generate discovery information; and
receiving, by the processor, the generated discovery information from the cloud storage, the generated discovery information being uploaded to the cloud storage from the agent.

10. The method of claim 9, further comprising:
identifying and uploading the resource information from the first VPC to the cloud storage through the probe based on characteristics of the instance in the second VPC.

11. The method of claim 9, further comprising:
identifying the resource information for the discovery of resources based on an operating system (OS) of the instance, the identified resource information including a scanner to scan the instance, a configuration file to configure the scanner, and/or a schedule information to scan the instance and to upload the generated discovery information to the cloud storage.

12. The method of claim 9, further comprising:
parsing the generated discovery information to generate configuration information (CI) correlated to the resources in the instance to be stored in a configuration management database (CMDB).

13. The method of claim 9, wherein the generated discovery information includes information for hardware resources and/or software resources in the instance, the information for the hardware resources and the software resources including information for a processing resource, a memory resource, a circuit board, an installed software, a running software, ports correlated to processes running on the instance, and/or a combination thereof.

14. The method of claim 9, further comprising:
identifying a process running on the instance based on information for hardware resources and/or software resources in the instance; and
determining installed software and/or running software in the instance based on the identified process running on the instance.

15. The method of claim 9, further comprising:
identifying a port correlated to a process running on the instance based on information for hardware resources and/or software resources in the instance; and
analyzing a connection between the instance in the VPC and another instance in another VPC among a plurality of VPCs connected to the cloud storage.

16. A non-transitory computer readable medium on which is stored machine readable instructions that, when executed by a processor, cause the processor to:
identify a scanner and a configuration file for the scanner to scan resources in an instance in a virtual private cloud (VPC), the scanner and the configuration file being identified based on an operating system (OS) of the instance;
upload the scanner and the configuration file to a cloud storage connected to the VPC, the scanner and the configuration file to be downloaded by an agent on the instance in the VPC to scan the instance to generate discovery information; and
receive the generated discovery information from the cloud storage, the generated discovery information being uploaded to the cloud storage from the agent.

17. The non-transitory computer readable medium of claim 16, wherein a probe VPC is connected to the cloud storage, the probe VPC being separate from the VPC and including a probe to receive and parse the generated discovery information from the cloud storage.

18. The non-transitory computer readable medium of claim 16, wherein the instructions cause the processor to:
parse the generated discovery information to generate configuration information (CI) correlated to the resources in the instance to be stored in a configuration management database (CMDB).

19. The non-transitory computer readable medium of claim 16, wherein the generated discovery information includes information for hardware resources and/or software resources in the instance, the information for the hardware resources and the software resources including information for a processing resource, a memory resource, a circuit board, an installed software, a running software, ports correlated to processes running on the instance, and/or a combination thereof.

20. The non-transitory computer readable medium of claim 16, wherein the instructions cause the processor to:
identify a process running on the instance based on information for hardware resources and/or software resources in the instance; and
based on the identified process running on the instance:
determine installed software and/or running software in the instance; and/or
analyze a connection between the instance in the VPC and another instance in another VPC among a plurality of VPCs connected to the cloud storage.

* * * * *